United States Patent
Zhang et al.

(10) Patent No.: US 9,010,380 B2
(45) Date of Patent: Apr. 21, 2015

(54) INNERDUCT

(71) Applicant: Changzhou Nanbo Composite Materia Co., Ltd., Changzhou, Jiangsu (CN)

(72) Inventors: Guoping Zhang, Changzhou (CN); Yu Zhang, Changzhou (CN)

(73) Assignee: Changzhou Nanbo Composite Materia Co., Ltd., Changzhou (CN)

( * ) Notice: Subject to any disclaimer, the term of this patent is extended or adjusted under 35 U.S.C. 154(b) by 3 days.

(21) Appl. No.: 14/027,380

(22) Filed: Sep. 16, 2013

(65) Prior Publication Data

US 2015/0075669 A1    Mar. 19, 2015

(51) Int. Cl.
| | |
|---|---|
| H02G 3/04 | (2006.01) |
| D03D 3/02 | (2006.01) |
| H01B 17/26 | (2006.01) |
| H02G 15/18 | (2006.01) |
| D03D 49/00 | (2006.01) |

(52) U.S. Cl.
CPC ............ *D03D 3/02* (2013.01); *H01B 17/26* (2013.01); *H02G 3/0481* (2013.01); *H02G 15/18* (2013.01)

(58) Field of Classification Search
CPC ... H02G 3/0481; H02G 15/18; H02G 3/0406; D03D 3/02; D03D 1/0035; D03D 13/00; D03D 15/0094; D03D 1/0088; F16L 7/00; F16L 59/021; F16L 11/02; F16L 55/1656; D04C 1/06

USPC ........... 428/34.1, 35.1, 36.3; 138/123, 110, 138/118, 118.1, 122, 124; 139/11, 387 R, 139/416, 420 R
See application file for complete search history.

(56) References Cited

U.S. PATENT DOCUMENTS

| | | | | |
|---|---|---|---|---|
| 6,309,721 | B1* | 10/2001 | Gladfelter et al. | 428/36.1 |
| 6,340,510 | B2* | 1/2002 | Hess et al. | 428/36.1 |
| 6,491,067 | B1* | 12/2002 | Davenport et al. | 138/110 |
| 6,774,312 | B2* | 8/2004 | Fatato | 174/102 D |
| 6,887,543 | B1* | 5/2005 | Louart et al. | 428/36.9 |
| 7,576,286 | B2* | 8/2009 | Chen | 174/117 M |
| 2003/0148866 | A1* | 8/2003 | Westerkamp | 492/48 |
| 2004/0081411 | A1* | 4/2004 | Gladfelter et al. | 385/100 |
| 2004/0231789 | A1* | 11/2004 | Blackmore et al. | 156/294 |
| 2005/0136255 | A1* | 6/2005 | Gladfelter et al. | 428/375 |
| 2005/0277087 | A1* | 12/2005 | Dds et al. | 433/136 |
| 2008/0066499 | A1* | 3/2008 | Andrieu et al. | 66/202 |
| 2010/0212952 | A1* | 8/2010 | Abdelmoula et al. | 174/390 |
| 2014/0220276 | A1* | 8/2014 | Gao et al. | 428/36.1 |
| 2014/0220846 | A1* | 8/2014 | Woodruff et al. | 442/208 |
| 2014/0272218 | A1* | 9/2014 | Thomas et al. | 428/35.1 |
| 2014/0305536 | A1* | 10/2014 | Gao et al. | 139/291 C |

* cited by examiner

*Primary Examiner* — Bobby Muromoto, Jr.
(74) *Attorney, Agent, or Firm* — Enshan Hong; VLP Law Group LLP

(57) ABSTRACT

A seamless and integrated textile innerduct having: a warp composed of polyester monofilament yarns and a weft composed of polyester multifilament yarns, wherein the warp has 70-85 ends per inch, the weft has 14-25 ends per inch, the warp and weft are integrated seamlessly to form an elongated enclosure having breaking strength of at least 1000 pounds, a vertical retraction rate of less than 3% at 150° C. for a duration of one hour, a longitudinal shrinkage rate of less than 3% at −80° C.; a pulling strip is placed inside the enclosure; the pulling strip is made of polyester multifilament yarns; and the inner duct is flexible and stretchable longitudinally.

5 Claims, 1 Drawing Sheet

INNERDUCT

BACKGROUND OF THE INVENTION

1. Field of the Invention

The present application relates to a textile innerduct, which is used for positioning cables and wires, in particular, telecommunication cables, in an external conduit.

2. Description of the Related Art

Fiber optic cables are usually placed into a pipe that is laid underground. In order to separate the cables in the same pipe and to avoid friction among the cables, a traditional method is to insert a group of hard innerducts of various sizes into the pipe, and then insert each cable into a different innerduct. The inner diameter of each innerduct must be considerably greater than the external diameter of the cable to prevent damage of the cable due to friction. In that case, the space in the innerduct is often wasted, resulting in low efficiency of the pipe that has been pre-laid, and increased cost of laying telecommunication pipes.

Therefore, there is a need for an improved innerduct that can maximize the use of limited space available in the innerduct.

SUMMARY OF THE INVENTION

The present application provides a seamless woven textile innerduct. The innerduct made of woven textile fabric directly in the absence of a subsequent step of slitting and sewing. The cross-section of the innerduct can be an O-shape. The inner duct is flexible and stretchable longitudinally. The woven textile composes of warp and weft yarns. The warp yarns are polyester monofilaments. The weft yarns are high-strength polyester composite multifilaments. The innerduct also comprises a pulling strip, which is placed inside the innerduct for facilitating inserting of a cable into the innerduct. The pulling strip is made of high strength polyester composite multifilaments. Preferably, the pulling strip is made concurrently with the weaving of the warp and weft yarns in the same machine.

Preferably, the warp yarns have 70-85 ends per inch. The weft yarns have 14-25 ends per inch.

The innerduct in accordance with the present invention can be woven in a circular warp weaving machine. The material for making the pulling strip is placed in the middle of the circular weaving machine so that the pulling strip can be made concurrently with the weaving of the warp and weft yarns. The size and other dimensions can be determined based on users' requirements. For example, a length mark (e.g., 1 meter, 2 meter . . . ) can be printed on the innerduct. The innerduct can be packaged with a wooden tray, and the length of the inner duct can be 300 meters, 500 meters, or 100 meters based on users' requirements. The innerduct can be covered with a sunscreen film. After the inner duct passes test, it can be labeled and stored in a ware house.

The innerduct in accordance with an embodiment of the present invention is smooth and free of wrinkles. The inner duct has a breaking length of 1000 pounds or more. The breaking length of the pulling strip is at least 1,050 pounds. The alcohol burner combustion melting point is 215° C. The vertical retraction rate at 150° C. for a duration of one hour is less than 3%. The longitudinal shrinkage rate at −80° C. is less than 3%.

In comparison with conventional HDPE innerducts, the innerduct in accordance with the present invention is light, has a small size, is not prone to water accumulation or absorption, can be bent freely, does not require a large site during innerduct laying, does not occupy a large space in an external pipe, therefore increasing the efficiency of utilizing limited underground space, and greatly reducing construction cost. Traditional HDPE innerducts are often bent or knotted during the process of laying the innerduct underground, has a short life of normal use, is prone to aging and forming reside pieces, which often clog pipes. The innerduct in accordance with the present invention overcomes the problem associated with the traditional HDPE innerducts and can last for as long as 50 years under the ground.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

DETAILED DESCRIPTION OF THE PRESENTLY PREFERRED EMBODIMENTS

One traditional woven fabric innerduct is made in a sub-jet loom or ordinary loom, using polyester composite filaments as warp and weft yarns. The woven fabric is then cut into strips of a desired size, and each of the cut strips can be sewn through a sewing machine to form an inner duct. This type of innerduct has the following drawbacks: 1) needle jumping often happens during the process of sewing the cut strip into an innerduct; 2) the sewn line of the innerduct often breaks or cracks.

In comparison, a seamless and endless integrated innerduct in accordance with an embodiment of the present invention can be made directly by using a circular weaving machine. The innerduct in accordance with an embodiment of the present invention is smooth and integrated, and does not have any drawbacks discussed above in connection with a textile innerduct that is made by sewing a cut strip of woven fabric.

Figure 1:
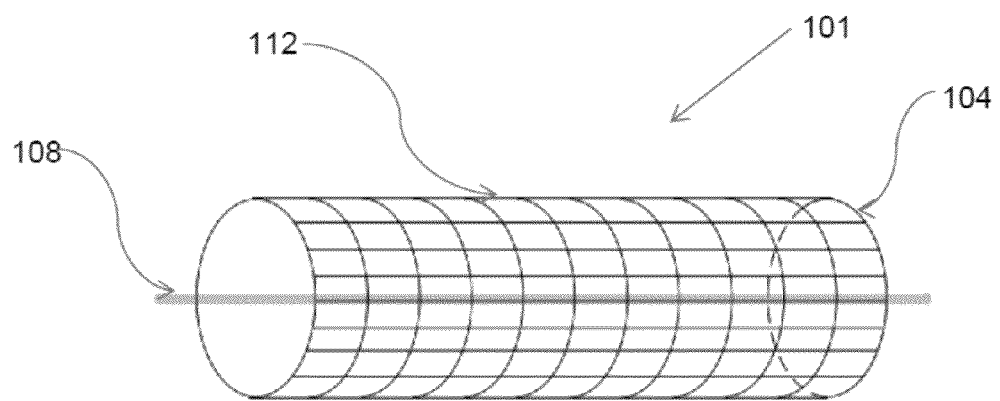
FIG. 1 illustrates the structure of an innerduct in accordance with an embodiment of the present invention.
Figure 2:
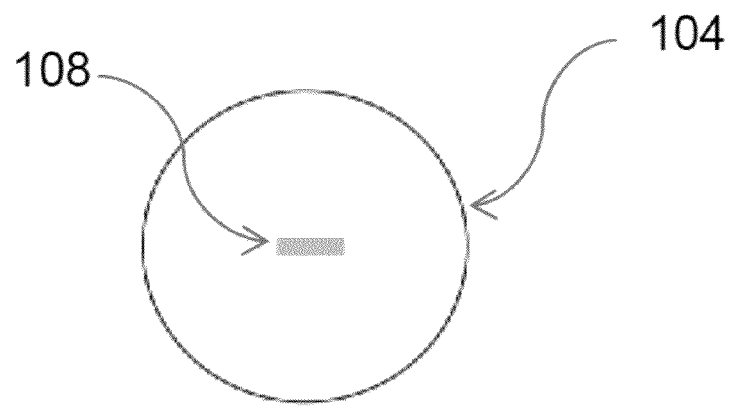
FIG. 2 is a left view of the innerduct shown in FIG. 1.

FIGS. 1 and 2 show a seamless innerduct 101 comprising warp 112, weft 104, and a pulling strip 108 in accordance with an embodiment of the present invention. As shown in FIGS. 1 and 2, there is no sewing line along the seamless innerduct.

The following table shows test results of an integrated seamless innerduct in accordance with an embodiment of the present invention.

| No. | Tested parameters | | Unit | Internal Standard | Test results |
|---|---|---|---|---|---|
| 1 | Color and appearance | | | White textile fabric, uniform width, smooth and free of wrinkles, resilient, no cracking or splitting | Comply with the standard |
| 2 | Dimensions | Valid width | mm | 50 ± 2 | 50 |
| | | Diameter of warp yarns | | 0.23 ± 0.02 | 0.23 |
| | | Diameter of weft yarn | | 0.19 ± 0.02 | 0.19 |
| 3 | Material | Warp yarns | | Polyester monofilaments | Comply with the standard |
| | | Weft yarns | | Polyester multifilaments | |

-continued

| No. | Tested parameters | Unit | Internal Standard | Test results |
|---|---|---|---|---|
| 4 | Breaking strength | kg | ≥400 | 490 |
| 5 | Breaking strength of pulling strip | kg | ≥550 | 640 |
| 6 | Elongation | | <3.0% at a pulling strength of 50 Kg | 1.0% |
| 7 | Molten point | ° C. | ≥215 | 224 |
| 8 | Vertical retraction rate | | 150° C., 1 h, <3% | 2% |

Example 1

A textile innerduct was made via seamless integration. It comprised warp and weft yarns. The warp yarns were made of polyester monofilaments with a diameter of 0.23 mm. The weft yarns are made of high strength polyester composite with a diameter of 0.19 mm and 1200 denier. The warp density is 76 ends per inch, and the weft density is 16 ends per inch. The innerduct (40 mm, i.e., half of the circumferential length)'s breaking strength is about 1000 pounds, tensile ductility at 150 pounds is less than 3%, longitudinal shrinkage rate at 150° C. for a duration of 1 hour is less than 3%. The innerduct has a good antifriction property. No damage caused by friction was found after 10,000 times friction under hardness 0.35 Gpa. The pulling strip inside the innerduct was made of high strength polyester composite yarns, is easy to use, and has a high intensity breaking strength of 1100 pounds. The melting point of the innerduct is 215° C. The innerduct has a good flexibility, and can be bent freely during the process of laying innerduct under the ground. It met pertinent industrial standards in China. The major advantages of an innerduct in accordance with the present invention include low volume, light weight, and small size. Its volume is only one third of that of a PE innerduct. A single innerduct (40 mm, half of the circumferential length) has a weight of 19 Kg per one thousand meters. It is convenient to use, has a good antifriction property, long usable life which is twice of that of an ordinary PE innerduct and can be as long as 50 years. It can be bent freely without distortion, is not prone to water accumulation, has good properties of anticorrosion and fire retardation, is environment friendly, greatly saves space in pipes, and efficiently utilizes limited underground pipeline resource, therefore avoiding repeated excavation.

The invention is not limited by the embodiments described above which are presented as examples only but can be modified in various ways within the scope of protection defined by the appended patent claims.

We claim:

1. A seamless and integrated textile innerduct comprising a warp comprised of polyester monofilament yarns; and a weft comprised of polyester multifilament yarns;
   wherein the warp has 70-85 ends per inch, the weft has 14-25 ends per inch, the warp and weft are integrated seamlessly to form an elongated enclosure; the elongated enclosure has a breaking strength of at least 1000 pounds, a vertical retraction rate of less than 3% at 150° C. for a duration of one hour, a longitudinal shrinkage rate of less than 3% at −80° C.; a pulling strip is placed inside the enclosure; the pulling strip is made of polyester multifilament yarns; and the inner duct is flexible and stretchable longitudinally.

2. The innerduct of claim 1 wherein the innerduct is made directly in a circular weaving machine free of a step of sewing a slit woven fabric.

3. The innerduct of claim 1 wherein the innerduct is made of polyester composite multifilament yarns.

4. The innerduct of claim 1 wherein the cross-section of the innerduct has an O-shape.

5. A process of making said seamless and integrated textile innerduct of claim 1 comprising:
   weaving polyester monofilament yarns as a warp and polyester multifilament yarns as weft in a circular weaving machine;
   placing polyester multifilament yarns to be used for making a pulling strip in the center of the circular weaving machine; and
   weaving the pulling strip simultaneously with the weaving of the warp and weft;
   wherein the process is free of a step of slitting a woven fabric or a step of sewing a slit woven fabric to form an elongated enclosure.

* * * * *